(12) United States Patent
Ueyanagi

(10) Patent No.: US 6,920,091 B2
(45) Date of Patent: Jul. 19, 2005

(54) OPTICAL REPRODUCTION APPARATUS AND OPTICAL RECORDING AND REPRODUCTION APPARATUS

(75) Inventor: Kiichi Ueyanagi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 487 days.

(21) Appl. No.: 09/771,705

(22) Filed: Jan. 30, 2001

(65) Prior Publication Data

US 2001/0014061 A1 Aug. 16, 2001

(30) Foreign Application Priority Data

Feb. 10, 2000 (JP) .......................................... 2000-033599

(51) Int. Cl.⁷ .............................................. G11B 7/121
(52) U.S. Cl. ............................... 369/44.23; 369/44.37; 369/44.41; 369/13.05; 369/13.44; 369/112.03; 369/118; 369/112.15
(58) Field of Search ...................... 369/44.23, 44.37, 369/44.41, 13.05, 13.44, 118, 112.15, 112.03, 112.19, 44.24, 44.32, 112.01, 13.35, 275.1, 13.46, 275.4, 124.03, 110.02, 126, 288, 112.28, 112.22; 428/84.4; 430/270.14

(56) References Cited

U.S. PATENT DOCUMENTS

| | | | | |
|---|---|---|---|---|
| 5,590,110 A | * | 12/1996 | Sato | 369/112.03 |
| 5,592,461 A | * | 1/1997 | Tsujioka et al. | 369/126 |
| 5,625,613 A | * | 4/1997 | Kato et al. | 369/112.15 |
| 5,717,662 A | * | 2/1998 | Nishimura | 369/13.44 |
| 5,774,444 A | * | 6/1998 | Shimano et al. | 369/110.02 |
| 5,802,036 A | | 9/1998 | Ohba et al. | |
| 5,812,515 A | * | 9/1998 | Matsui | 369/124.03 |
| 5,818,811 A | * | 10/1998 | Fujii | 369/275.4 |
| 6,072,763 A | * | 6/2000 | Takahashi | 369/118 |
| 6,141,302 A | * | 10/2000 | Koyama et al. | 369/44.24 |
| 6,178,151 B1 | * | 1/2001 | Hino et al. | 369/118 |
| 6,181,650 B1 | * | 1/2001 | Ichihara | 369/13.05 |
| 6,274,288 B1 | * | 8/2001 | Kewitsch et al. | 430/270.14 |
| 6,285,652 B1 | * | 9/2001 | Tsai et al. | 369/275.1 |

OTHER PUBLICATIONS

J. Tominaga et al., "An approach for recording and readout beyond the diffraction limit with an Sb thin film", Applied Physics Letter, vol. 73, No. 15, 1998, pp. 2078–2080.

H. Fuji et al., "A near–field recording and readout technique using a reflective aperture in an optical disk", Tech. Dig. ISOM/ODS '99, TuD–29, 1999, pp. 423–425.

"Near–field Nanophotonics Handbook", The Optronics Co., Ltd., 1997, pp. 177–182.

* cited by examiner

*Primary Examiner*—Tan Dinh
*Assistant Examiner*—Kim-Kwok Chu
(74) *Attorney, Agent, or Firm*—Oliff & Berridge, PLC

(57) ABSTRACT

There is provided an optical reproduction apparatus and an optical recording and reproduction apparatus which can improve a CNR and can read at high speed. The center portion of a laser light emitted from a semiconductor laser is shaded by a light shading portion of a first light shade, and its peripheral portion is condensed and irradiates a super-resolution film of an optical disk. The center portion of a reflected light from the optical disk is mainly made of a signal component, and a noise component almost disappears. Thus, the reflected light from the optical disk is separated into the center portion and its peripheral portion, and the reflected light made of the signal component of the center portion is used for signal reproduction, so that the CNR can be increased.

16 Claims, 9 Drawing Sheets

OPTICAL REPRODUCTION APPARATUS AND OPTICAL RECORDING AND REPRODUCTION APPARATUS

BACKGROUND OF THE INVENTION

1. Field of the Invention

The present invention relates to an optical reproduction apparatus and an optical recording and reproduction apparatus, such as an optical disk apparatus for performing recording and reproduction of information to an optical disk in which a super-resolution film is deposited on a recording layer, and particularly to an optical reproduction apparatus and an optical recording and reproduction apparatus which can improve a CNR and can perform high speed reproduction.

2. Description of the Related Art

In an optical disk apparatus, an optical disk has been improved to achieve high density and large capacity from a compact disk (CD) to a digital video disk (DVD), and still more, large capacity has been demanded according to the improvement of the performance of computers and display devices. Particularly, an optical disk apparatus of a so-called Super-RENS (Super-Resolution Near-field Structure) method in which recording and reproduction is performed by using near-field light leaked out from a super-resolution film provided near a recording medium of an optical disk has attracted attention as a technologies suitable for achieving high density of a future optical disk since a conventional optical system used for a DVD or the like can be used and an optical disk can be made rewritable.

A conventional optical disk apparatus adopting this Super-RENS method is disclosed in, for example, "Applied Physics Letter, Vol. 73, No. 15, 1998, pp. 2078–2080" (hereinafter referred to as a document I) and "Tech. Dig. ISOM/ODS '99, TuD-29, 1999, pp. 423–425" (hereinafter referred to as a document II).

FIGS. 9A and 9B show an optical disk apparatus disclosed in the document I. This optical disk apparatus includes An aperture type Super-RENS optical disk 20A, an irradiation optical system for irradiating the optical disk 20A with a condensed light 2d obtained by condensing a parallel laser beam 2b through an objective lens 8, and a reproduction optical system (not shown) for detecting a reflected light 19a from the optical disk 20A and performing reproduction. In the aperture type Super-RENS optical disk 20A, a substrate protecting layer 22 made of SiN, a Sb super-resolution film 23a, a spacer made of dielectric layer 24 made of SiN and having a thickness of 20 nm, a phase change type recording layer 25 made of GeSbTe, and a surface protecting layer 26 made of SiN are sequentially formed on a disk substrate 21. When the Sb super-resolution film 23a is heated up to a certain temperature or higher, a phase change between crystal and amorphous occurs and absorptance of light is decreased. At the time of recording, as shown in FIG. 9A, the parallel laser beam 2b is condensed by the objective lens 8 and the Sb super-resolution film 23a is irradiated with the condensed light 2d of suitable intensity. The phase change between crystal and amorphous occurs and the light absorptance is decreased by heating the center portion of a light spot 17 of the Sb super-resolution film 23a, then a minute aperture 18a is formed at the center portion. By near-field light 19 transmitted through this minute aperture 18a, recording is performed in the recording layer 25. When the wavelength of the laser light 19 is 635 nm, and the numerical aperture of the objective lens 8 is 0.6, the diameter of the light spot 17 becomes about 0.5 $\mu$m. However, the Sb super-resolution film 23a functions as a so-called super-resolution film which enables minute recording below the diffraction limit by the objective lens 8, so that a recording mark of 0.1 $\mu$m or less which is far smaller than the diameter of the light spot 17 can be formed in the recording layer 25.

At the time of reproduction, as shown in FIG. 9B, scattering of the near-field light occurs by the minute aperture 18a and the recording layer 25, the scattered light (reflected light) 19a passes through the minute aperture 18a and almost uniformly spreads at the minute aperture 18a as a secondary point light source. The light 19b is guided with the reproduction optical system (not shown) and is incident on a photo detector (not shown), and a signal is reproduced.

FIGS. 10A and 10B show an optical disk apparatus disclosed in the document II. This optical disk apparatus includes a scattering type Super-RENS optical disk 20B, and similarly to the document I, an irradiation optical system for irradiating the optical disk 20B with a condensed light 2d obtained by condensing a parallel laser beam 2b through an objective lens 8, and a reproduction optical system (not shown) for detecting a reflected light from the optical disk 20B and performing reproduction. The scattering type Super-RENS optical disk 20B uses an AgOx super-resolution film 23b instead of the Sb super-resolution film 23a, and a substrate protecting layer 22, a spacer made of dielectric layer 24 and a surface protecting layer 26 use $SiO_2$ as the material instead of SiN. When the AgOx super-resolution film 23b is heated up to a certain temperature or higher, Ag is extricated by a reducing reaction, so the super-resolution effect can occur as well. That is, by the above structure, similarly to the aperture type Super-RENS optical disk, when the condensed light 2d is condensed to the AgOx super-resolution film 23b, the center portion of the light spot 17 of the AgOx super-resolution film 23b is reduced so that a minute metal body 18b made of Ag is formed. This minute metal 18b scatters the condensed light 2d or a surface plasmon excited in the minute metal body 18b generates a near-field light 19c, so that recording is performed in the recording layer 25. Similarly to the Sb super-resolution film 23a, the AgOx super-resolution film 23b functions as the so-called super-resolution film which enables minute recording below the diffraction limit of condensing by the objective lens 8, so that it is possible to form a recording mark of 0.1 $\mu$m or less far smaller than the diameter of the light spot 17 in the recording layer 25.

At the time of reproduction, scattering of the near-field light occurs by the minute metal body 18b and the recording layer 25, as shown in FIG. 10B, the scattered light 19d uniformly spreads and passes through the vicinity of the minute metal body 18b. A parallel light 19b is guided by the reproduction optical system (not shown) and is incident on a photo detector (not shown), so that a signal is reproduced.

However, according to the conventional optical disk apparatus shown in FIGS. 9A and 9B, the diameter of the light spot 17 condensed to the Sb super-resolution film 23a is about 0.6 $\mu$m, while the size of the minute aperture 18a becomes 0.1 $\mu$m or less, which is as small as an area ratio of several tenths. Most of the laser light is reflected by the Sb super-resolution film 23a. The reflected light which picks up noise due to roughness or the like on the disk substrate 21 is incident on the reproduction optical system and is mixed in the reproduction signal to increase the noise, so that a CNR (Carrier to Noise Ratio) of the reproduction signal is low.

According to the conventional optical disk apparatus shown in FIGS. 10A and 10B, similarly to the above prior art, since the size of the minute metal body 18b is as small as an area ratio of several tenths as compared with the diameter of the light spot 17 condensed to the AgOx super-resolution film 23b, a laser light of a peripheral portion having intensity relatively lower than the center portion of the light spot 17 reaches the recording layer 25 and is reflected by the recording layer 25. Since the reflected light including the surface noise of the disk is incident on the reproduction optical system, the noise increases, so that there is a problem that the CNR of the reproduced signal is low.

FIG. 11 shows the CNR of the device shown in FIGS. 10A and 10B. According to the device of FIGS. 10A and 10B, as shown in FIG. 11, in recording of a minute mark of 0.1 μm or less which can not be attained by recording of a conventional system such as a CD or DVD, the CNR of a reproduced signal is 10 dB or less, which is remarkably low as compared with a CNR level of 45 dB required for signal reproduction of an optical disk, thereby signal reproduction without an error can not be made. The CNR of the aperture type Super-RENS optical disk is also at the same level or lower.

Besides, since the condensed light 2d is condensed also in the normal direction to the AgOx super-resolution film 23b and the excitation condition of resonance plasmon expected in the scattering type Super-RENS is not satisfied, a strengthening effect of scattering by the minute metal body 18b is not obtained. Since there is a problem that light intensity for recording and reproduction can not be sufficiently obtained, high speed recording and reproduction are prevented.

SUMMARY OF THE INVENTION

The present invention has been made in view of the above circumstances and provides an optical reproduction apparatus and an optical recording and reproduction apparatus which can improve the CNR and can perform high speed reproduction.

According to the present invention, an optical reproduction apparatus for reproducing information from an optical recording medium in which a super-resolution film is deposited on a recording layer having the information recorded therein is provided. The optical reproduction apparatus includes: an irradiation optical system for condensing a laser light and irradiating the super-resolution film with the light, in which the laser light has a light intensity distribution a center portion of which is lower than that of its peripheral portion; and a reproduction optical system for separating a center portion and a peripheral portion of a reflected light reflected from the optical recording medium by the irradiation thereof with the laser light and reproducing the information from the center portion of the reflected light.

According to the above structure, the laser light having the light intensity distribution in which the light intensity of the center portion is lower than that of the peripheral portion is condensed and the super-resolution film is irradiated with the light, so that the center portion of the reflected light from the optical recording medium is mainly made of a signal component, and a noise component almost disappears. By separating the reflected light from the optical recording medium into the center portion and the peripheral portion, the reflected light made of the signal component of the center portion can be used for signal reproduction, so that the CNR can be increased.

As the super-resolution film, the aperture type Super-RENS optical disk and the scattering type Super-RENS optical disk can be used. In the case where the scattering type Super-RENS optical disk is used as the super-resolution film, when resonance of a surface plasmon is made to occur in the minute metal body, It becomes possible to increase the intensity of a near-field light leaked out from it in several digit. This resonance condition is that the phase of the near-field light generated by the incident laser light is coincident with the phase of the surface plasmon, which become possible when the laser light is made obliquely incident.

Moreover, according to the present invention, in optical recording and reproduction apparatus for performing recording and reproduction of information to an optical recording medium in which a super-resolution film is deposited on a recording layer, the optical recording and reproduction apparatus includes: an irradiation optical system for condensing a laser light and irradiating the super-resolution film with the light, in which the laser light has a light intensity distribution a center portion of which is lower than that of its peripheral portion; a reproduction optical system for separating a center portion and a peripheral portion of a reflected light reflected from the optical recording medium by the irradiation thereof with the laser light and reproducing the information from the center portion of the reflected light; and a modulation unit for modulating the laser light passing through an optical path of the irradiation optical system in accordance with the information.

BRIEF DESCRIPTION OF THE DRAWINGS

Preferred embodiments of the present invention will be described in detail based on the following figures, wherein:

FIGS. 6A to 6E relate to semiconductor lasers of a sixth embodiment of the present invention, in which FIGS. 6A and 6B are views showing an edge emitting semiconductor laser, and FIG. 6C to 6E are views showing a vertical cavity surface emitting semiconductor laser;

DETAILED DESCRIPTION OF THE PREFERRED EMBODIMENTS

Figure 1A:
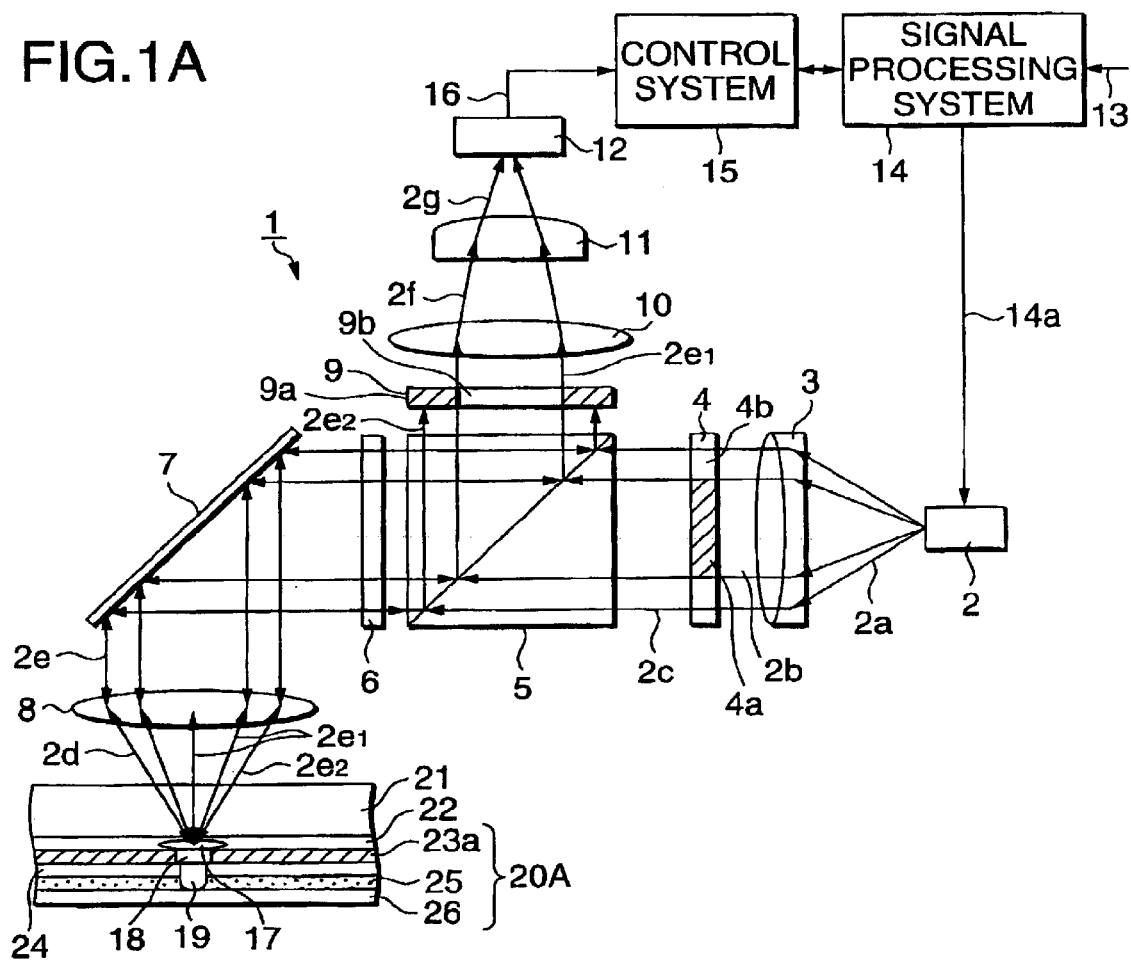
FIG. 1A is a view showing an optical disk apparatus to which an optical recording and reproduction apparatus of a first embodiment of the present invention is applied.

FIG. 1A shows an optical disk apparatus to which an optical recording and reproduction apparatus of a first embodiment of the present invention is applied. This optical disk apparatus 1 includes a semiconductor laser 2 for emitting a laser beam 2a, a collimator lens 3 for shaping the laser beam 2a from the semiconductor laser 2 into a parallel beam 2b, a first light shade 4 for shading the center portion of the parallel beam 2b from the collimator lens 3 and allowing its peripheral portion to pass through, a polarization beam splitter 5 for separating a hollow parallel beam 2c transmitted through the first light shade 4 from a reflected light 2e from an optical disk 20A, a ¼ wavelength plate 6 for making the parallel beam 2c transmitted through the first light shade 4 and the polarization beam splitter 5 a circularly polarized light, a folding mirror 7 for reflecting the parallel beam 2c toward the vertical direction, an objective lens 8 for condensing the parallel beam 2c reflected by the mirror 7 to the optical disk 20A, the optical disk 20A in which recording and reproduction is made by a condensed light 2d from the objective lens 8, a second light shade 9 for allowing a center portion of the reflected light 2e (signal light $2e_1$, reflected light $2e_2$) reflected by the optical disk 20A and separated by the polarization beam splitter 5 to pass through and shading its peripheral portion, a condensing lens 10 for condensing the signal light $2e_1$, transmitted through the second light shade 9, a cylindrical lens 11 for dividing a convergent light 2f from the condensing lens 10 by changing condensing positions in the vertical direction and the horizontal direction, a four-section photo detector 12 for detecting a divided light 2g from the cylindrical lens 11, a signal processing system 14 for providing a recording signal 14a to the semiconductor laser 2 on the basis of a recording and reproduction signal 13 from a computer (not shown) and for processing and reproducing a reflected signal 16 from the photo detector 12, and a control system 15 for performing tracking control and automatic focusing control on the basis of the reflected signal 16 from the photo detector 12.

The control system 15 forms a tracking error signal by a sample servo method (Radio Technique Corp. p. 105, 1988) using embossed marks arranged at the right and left of tracks in a staggered shape on the basis of the reflected signal 16 obtained from the photo detector 12, forms a focus error signal by an astigmatism method using the cylindrical lens 11, performs the tracking control on the basis of the tracking error signal, and performs the automatic focusing control on the basis of the focus error signal.

The optical disk 20A is an aperture type Super-RENS optical disk. A substrate protecting layer 22 made of SiN, a Sb super-resolution film 23a, a spacer made of dielectric layer 24 made of SiN and having a thickness of 20 mn, a phase change type recording layer 25 made of GeSbTe, and a surface protecting layer 26 made of SiN are sequentially formed on a disk substrate 21.

Figure 1B:
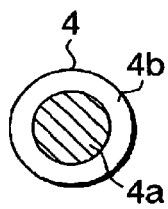
FIG. 1B is a view showing a first light shade.
Figure 1C:
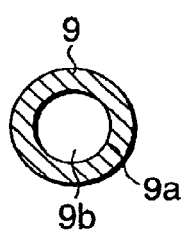
FIG. 1C is a view showing a second light shade.
Figure 1D:
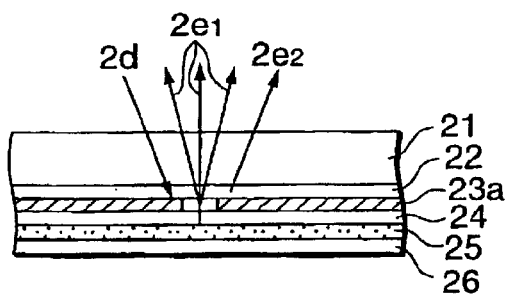
FIG. 1D is a view showing the relation between an incident light and a reflected light in a super-resolution film.

FIG. 1B shows the first light shade 4, and FIG. 1C shows the second light shade 9. The first light shade 4 includes a circular light shading portion 4a provided at the center and a transparent portion 4b provided at the periphery. The second light shade 9 includes a donut-shaped light shading portion 9a and a transparent portion 9b provided at the center. The light shading portion 4a of the first light shade 4 and the light shading portion 9a of the light shade 9 have an optically complementary relation, and are adjusted such that the reflected light $2e_2$ at the Sb super-resolution film 23a by the laser light 2d passing through the transparent portion 4b of the first light shade 4 is shaded by the light shading portion 9a. The outer diameter of the light shading portion 4a of the first light shade 4 and the inner diameter of the light shading portion 9a of the second light shade 9 are set such that an incident angle θi to the Sb super-resolution film 23a from the objective lens 8 becomes slightly larger than the critical angle θc at the Sb super-resolution film 23a.

As the semiconductor laser 2, a semiconductor laser of red light emission (wavelength of 650 mn) made of an AlGaInP-based semiconductor crystal is used.

The operation of this device will be described as follows. The signal processing system 14 provides recording signal 14a to the semiconductor laser 2 on the basis of the recording and reproduction signal 13 from the computer (not shown). When the semiconductor laser 2 emits the laser beam 2a on the basis of the recording signal 14a, the laser beam 2a is shaped into the parallel beam 2b by the collimator lens 3, and the center portion is shaded by the light shading portion 4a of the first light shade 4. The hollow parallel beam 2c passing through the transparent portion 4b of the first light shade 4 and the polarization beam splitter 5 is made the circularly polarized light by the ¼ wavelength plate 6, is reflected by the folding mirror 7, and is condensed onto the optical disk 20A by the objective lens 8. When the Sb super-resolution film 23a of the optical disk 20A is irradiated with the condensed light 2d of predetermined light intensity from the objective lens 8, the Sb super-resolution film 23a is heated and the absorption coefficient of the center portion of the irradiated area is reduced, because of the phase change of the film between amorphous and crystal. The reduction of the absorption forms a minute aperture in the central portion and a near-field light leaks out from the aperture 18a. The near-field light 19 reaches the recording layer 25, and the recording layer 25 is changed between amorphous and crystal in accordance with the intensity of the near-field light 19, so that reflectivity is changed and recording is made.

At reproduction, the near-field light 19 generated from the minute aperture 18a by the hollow condensed light 2d from the objective lens 8 is reflected by the recording mark of the recording layer 25, and the signal light $2e_1$ is reflected upward in the vertical direction through the minute aperture 18a. At this time, out of the hollow condensed light 2d from the objective lens 8, the reflected light $2e_2$ reflected at the Sb super-resolution film 23a, together with the signal light $2e_1$, is made the parallel beam 2e as the reflected light 2e by the objective lens 8, and after its polarization direction is rotated by 90 degrees with respect to the incident beam 2c by the ¼ mwavelength plate 6, it is folded by the polarization beam splitter 5 by 90 degrees, is separated from the incident beam 2c, and is incident on the reproduction optical system. In the reflected light 2e (signal light $2e_1$, reflected light $2e_2$) which is folded by the polarization beam splitter 5 by 90 degrees, the reflected light $2e_2$ is shaded by the light shading portion 9a of the second light shade 9, and the signal light $2e_1$ is transmitted through the transparent portion 9b. The signal light $2e_1$ transmitted through the second light shade 9 is converged by the condensing lens 10, the convergent light 2f is divided by the cylindrical lens 11 by changing condensing positions in the vertical direction and horizontal direction, and is incident on the four-section photo detector 12 as the divided light 2g. The photo detector 12 receives the divided light 2g corresponding to the signal light $2e_1$ and provides the reflected signal 16 to the control system 15 and the signal processing system 14. The control system 15 forms the tracking error signal and the focus error signal on the basis of the reflected signal 16 from the photo detector 12, performs the tracking control on the basis of the tracking error signal, and performs the automatic focusing control on the basis of the focus error signal. The signal processing system 14 processes the reflected signal 16 from the photo detector 12 and makes reproduction.

According to the foregoing first embodiment, since the laser light 2d having the light intensity distribution in which the light intensity of the center portion is lower than that of the peripheral portion is condensed and the Sb super-resolution film 23a is irradiated with the condensed light, the center portion of the reflected light 2e from the optical disk 20A is mainly made of a signal component and a noise component almost disappears. Further, since the signal light $2e_1$ reflected by the recording mark of the near-field light 19 spreads almost uniformly after passing through the minute aperture 18a, although a part thereof is shaded by the second light shade 9, the reflected light $2e_2$ having the disk noise component passes through only the peripheral portion of the optical path and is shaded by the second light shade 9. Thus, the signal component becomes main in the laser light 2g incident on the photo detector 12 and signal reproduction with a high CNR becomes possible.

Figure 2:
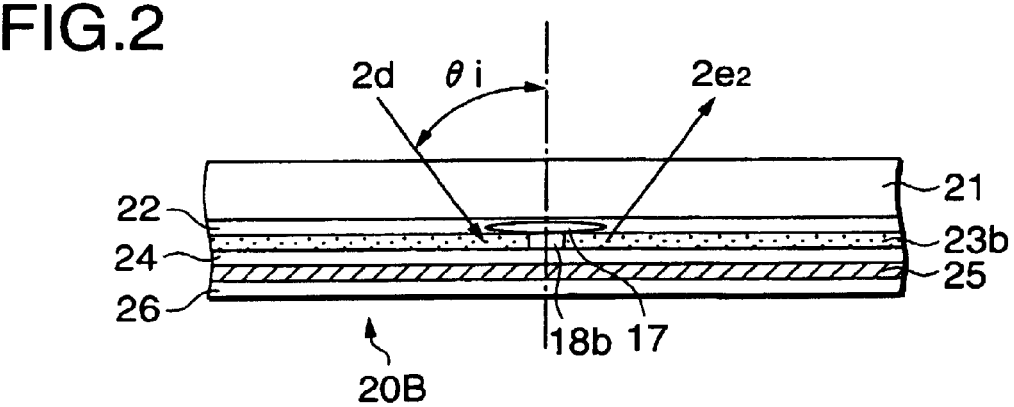
FIG. 2 is a view showing the main portion of an optical disk apparatus to which an optical recording and reproduction apparatus of a second embodiment of the present invention is applied.

FIG. 2 shows an optical disk of an optical disk apparatus to which an optical recording and reproduction apparatus of a second embodiment of the present invention is applied. An optical disk 20B of this device is of the scattering type Super-RENS, and as compared with the optical disk 20A of the first embodiment, an AgOx super-resolution film 23b is used as a super-resolution film, and $SiO_2(ZnS—Si_2)$ obtained by adding ZnS to $SiO_2$, which is often used for a phase change disk, is used for a substrate protecting layer 22, a spacer made of dielectric layer 24, and a surface protecting film 26. The other parts are the same as those of the first embodiment. At the center portion of a light spot 17 having high light intensity, AgOx is reduced by a laser light 2d and Ag is extricated. The laser light 2d is scattered by an Ag minute metal body 18b formed by this light reducing reaction. Besides, a plasmon is excited in the Ag minute metal body 18b, and a near-field light is generated from it. This scattered light or near-field light is incident on the recording layer 25, and recording and reproduction is made. On the other hand, at the peripheral portion of the light spot 17 having low light intensity, the light reducing reaction does not sufficiently proceed, most of the incident laser light 2d is transmitted through the AgOx super-resolution film 23b, is incident on the recording layer 25, and is reflected and absorbed in the recording layer 25. The reflected light 2e is shaded by the light shade 9 similarly to the first embodiment. It is necessary to suppress the intensity of absorbed light to such a degree that an influence is not exerted on the recording layer 25. For that purpose, it is necessary to enlarge an incident angle $\theta i$ of the laser light 2d, the numerical aperture of the objective lens 8 is increased, and the size of the light shade 4 is enlarged so that the laser light is transmitted through only its peripheral portion. The refractive index of ZnS—$SiO_2$ of the spacer made of dielectric layer 24 is determined by a mixture ratio of ZnS (refractive index of 2.36) and $SiO_2$ (refractive index of 1.46). Since the ratio of ZnS is made 0.1 or less, the refractive index becomes about 1.55. Since the refractive index of AgOx is 2.5, a critical angle becomes about 38 degrees. In the incident light, the reflectivity of an S polarized wave is increased with the incident angle $\theta i$. In a P polarized wave, after it is decreased once at the incident angle $\theta i$ corresponding to the critical angle, reflection is rapidly increased. When the numerical aperture NA of the objective lens 8 is made, for example, 0.85, the incident angle $\theta i$ of the peripheral light can be made 50 degrees or more, and most of the peripheral incident light can be reflected.

The outer diameter of the light shading portion 4a of the first light shade 4 is determined, similarly to the first embodiment, such that the condensed light 2d from the objective lens 8 is incident at an angle slightly larger than an incident critical angle $\theta c$ at the lower surface of the AgOx super-resolution film 23b. The refractive index of ZnS—$SiO_2$ of the spacer made of dielectric layer 24 is determined by a mixing ratio of ZnS (refractive index of 2.36) and $SiO_2$ (refractive index of 1.46).

This incident condition is also suitable for causing plasmon resonance excitation in the Ag minute metal body 18b. That is, as is explained in "Near-field Nanophotonics Handbook" (The Optronics Co., Ltd., 1997, pp. 177–182), by making the laser light obliquely incident from the side of the medium, it is possible to make the dispersion curve of the surface plasmon coincident with the dispersion curve of the near-field light formed in the vicinity of the Ag minute metal body 18b, and it becomes possible to excite the plasmon. The near-field light can be reinforced by the plasmon to a value ten or more times higher, and signal reproduction with a high CNR becomes possible.

Figure 3:
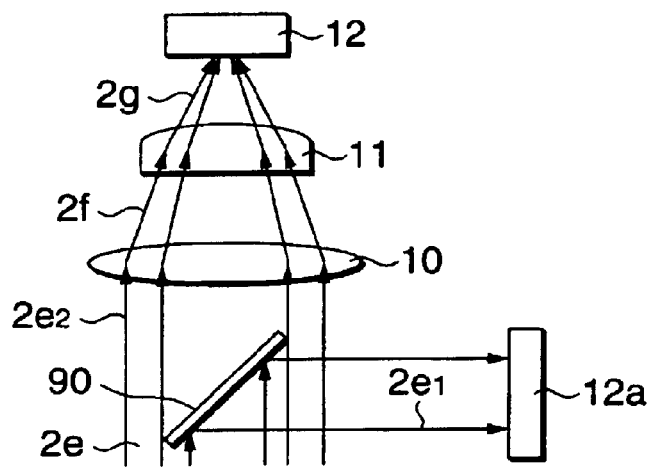
FIG. 3 is a view showing the main portion of an optical disk apparatus to which an optical recording and reproduction apparatus of a third embodiment of the present invention is applied.

FIG. 3 shows the main portion of an optical disk apparatus to which an optical recording and reproduction apparatus of a third embodiment of the present invention is applied. In the third embodiment, instead of the second light shade 9, there is a mirror 90 which reflects the center portion of a reflected light 2e and allows its peripheral portion to pass through. Besides, there are provided a signal photo detector 12a for detecting a signal light $2e_1$ reflected by the mirror 90, and a four-section photo detector 12 for detecting a reflected light $2e_2$ passing through the periphery of the mirror 90 through a condensing lens 10 and a cylindrical lens 11.

A control system 15 forms error signals for automatic focusing control and tracking control on the basis of the detected signal obtained from the four-section photo detector 12 detecting a peripheral light 2f, which are formed by an astigmatism method and a sample servo method, respectively.

According to the third embodiment, since the peripheral light 2f having high light intensity as compared with the signal light $2e_1$ of the center portion can be used for control, stable control becomes possible. Since the signal light $2e_1$ is not divided but is used for only reproduction of the recording signal, it becomes possible to improve the CNR. Incidentally, coarse tracking may be made by the peripheral light 2f and fine tracking of a recording track may be made by the signal light $2e_1$ of the center portion. By using this system, after high speed approach to an objective track by using a coarse tracking mechanism, fine tracking can be made. Besides, by combining both, stable tracking with a wide range and high gain becomes possible.

Figure 4:
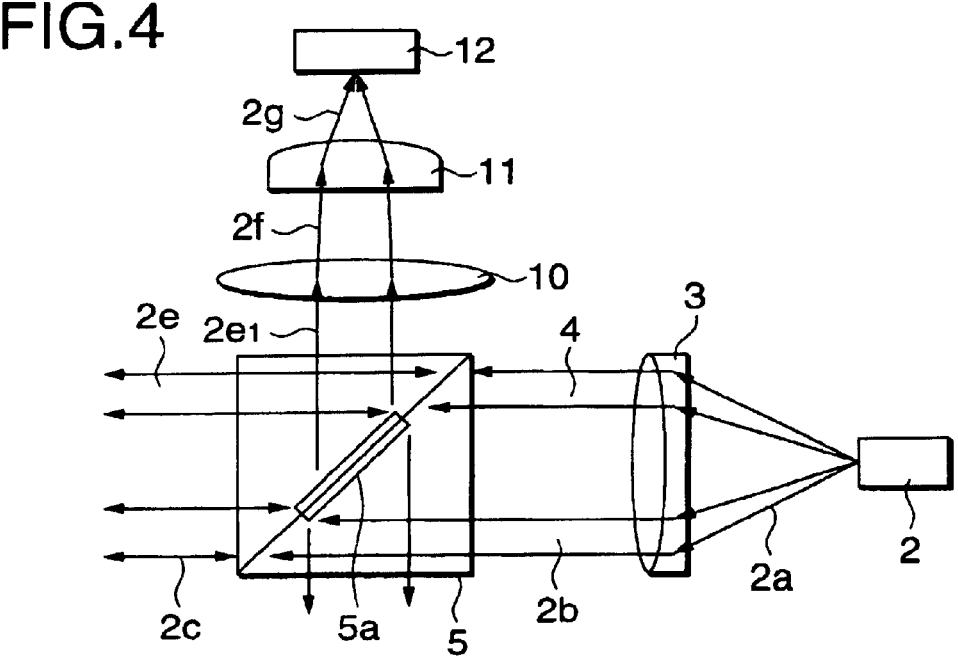
FIG. 4 is a view showing the main portion of an optical disk apparatus to which an optical recording and reproduction apparatus of a fourth embodiment of the present invention is applied.

FIG. 4 shows the main portion of an optical disk apparatus to which an optical recording and reproduction apparatus of a fourth embodiment of the present invention is applied. In the fourth embodiment, the first light shade 4 and the second light shade 9 of the first embodiment are common, and a mirror 5a is arranged at the center portion of a polarization beam splitter 5. By this, a parallel beam 2b from a semiconductor laser 2 is converted into a hollow parallel beam 2c by the mirror 5a and the side of an optical disk 20 (20A or 20B) can be irradiated with the beam the side of an optical disk 20 (20A or 20B). The peripheral portion of a reflected light 2e from the optical disk 20A or 20B passes through the polarization beam splitter 5 and is returned toward the semiconductor laser 2. The center portion of the reflected light 2e is reflected by the mirror 5a and is incident on a four-section photo detector 12 through a condensing lens 10 and a cylindrical lens 11. According to the fourth embodiment, since the incident light 2b and the reflected light 2e can be separated by the mirror 5a, it is possible to make the ¼ wavelength plate 6 unnecessary, and it is possible to irradiate the optical disk 20 with the laser light of linear polarization. This is suitable for plasmon excitation. That is, in the case where the light is incident on the minute metal body 18b under the condition of a p-polarized wave, a reinforcing effect by the plasmon of the near-field light can be made maximum.

Figure 5:
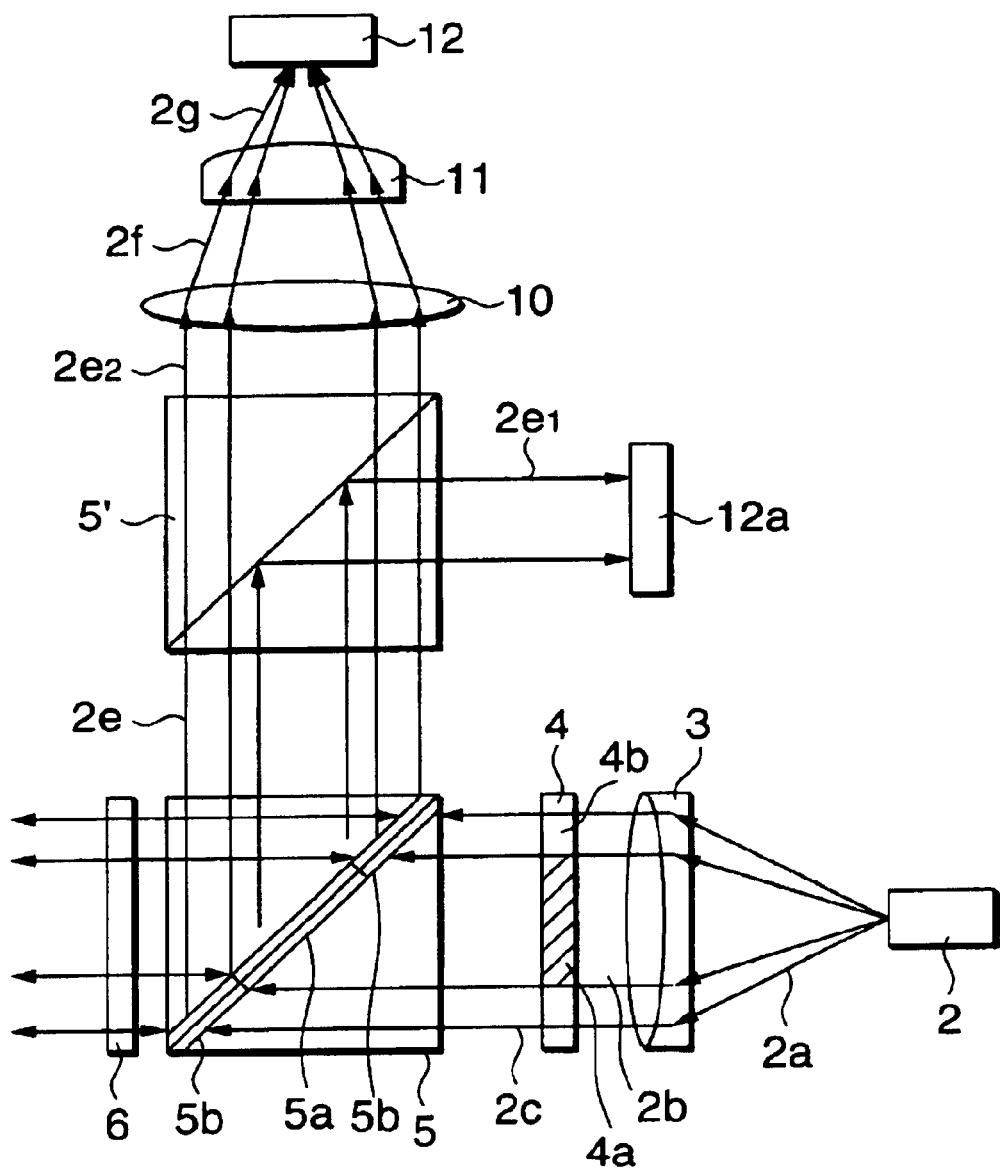
FIG. 5 is a view showing the main portion of an optical disk apparatus to which an optical recording and reproduction apparatus of a fifth embodiment of the present invention is applied.

FIG. 5 shows the main portion of an optical disk apparatus to which an optical recording and reproduction apparatus of a fifth embodiment of the present invention is applied. Comparing the fifth embodiment with the first embodiment, a mirror 5a is arranged at the center portion of a polarization beam splitter 5 instead of the second light shade 9, and a beam splitter film 5b of polarization dependency is formed around the mirror 5a. A reflected light 2e folded by the beam splitter 5 is separated into a signal light $2e_1$ and a reflected light $2e_2$ by another polarization beam splitter 5'. Similarly to FIG. 3, the signal light $2e_1$ is detected by a signal photo detector 12a, and the reflected light $2e_2$ is detected by a four-section photo detector 12.

Figure 6A:
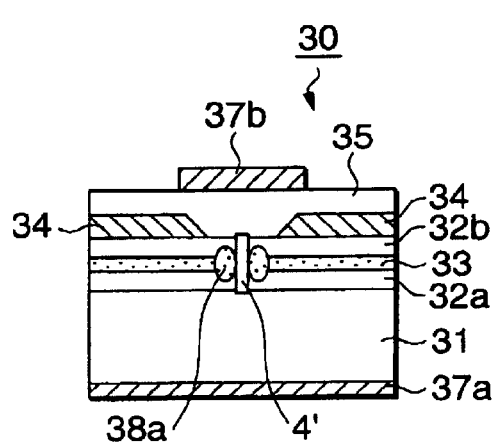
Figure 6B:
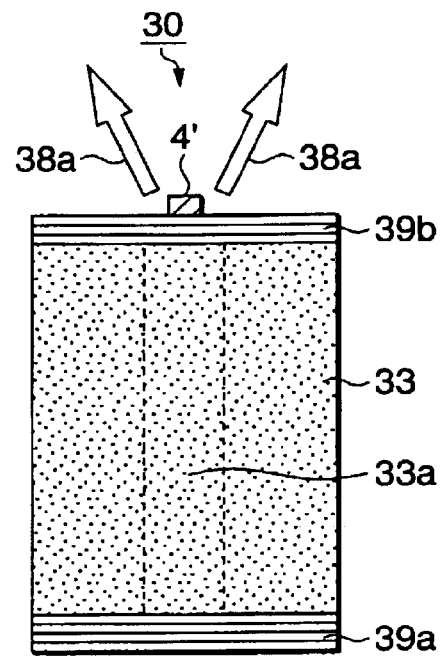
Figure 6C:
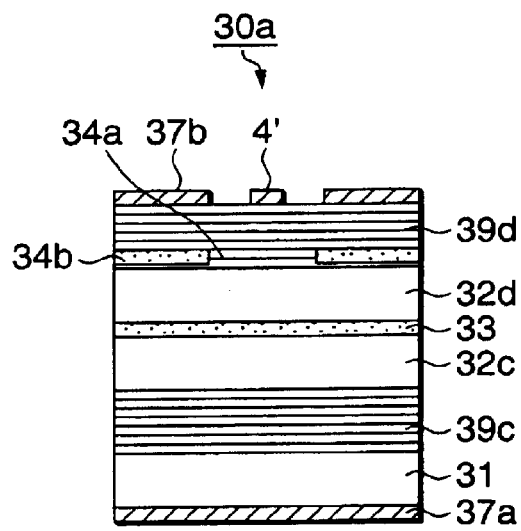
Figure 6D:
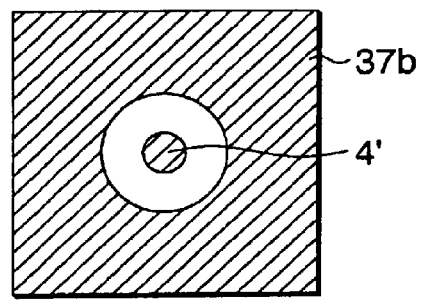
Figure 6E:
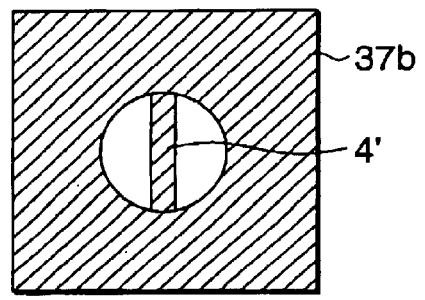

FIGS. 6A to 6E show semiconductor lasers of a sixth embodiment of the present invention. The respective semiconductor lasers are constructed such that instead of the first light shade 4 of the first embodiment, a light shade 4' is provided at a output position of a light output surface of the semiconductor laser so as to shade the center portion. FIGS. 6A and 6B show an edge emitting semiconductor laser of red (650 nm) emission, and FIGS. 6C, 6D and 6E show a vertical cavity surface emitting semiconductor laser of red (650 nm) emission.

As shown in FIGS. 6A and 6B, although the edge emitting semiconductor laser 30 is a buried ridge structure laser limiting an oscillation region with a current limiting layer 34, other structures can also be used. As shown in FIG. 6A, the edge emitting semiconductor laser 30 includes a semiconductor substrate 31 made of n-type GaAs, an n-type AlGaInP cladding layer 32a, a GaInP active layer 33, a p-type AlGaInP cladding layer 32b, an n-type GaAs current limiting layer 34, a p-type GaAs cap layer 35, an n electrode 37a, and a p electrode 37b. As shown in FIG. 6B, the semiconductor laser 30 further includes a high reflective multi-layer film 39a provided at a rear end, a low reflective multi-layer film 39b provided at an output surface, and a light shade 4' formed on the low reflection multi-layer film 39b and on an extension of a center portion of the active layer 33a. The edge emitting semiconductor laser 30 is manufactured in a manner described below. First, after the n-type AlGaInP cladding layer 32a, the GaInP active layer 33, the p-type AlGaInP cladding layer 32b, the n-type GaAs current limiting layer 34, and the p-type GaAs cap layer 35 are deposited on the semiconductor substrate 31 made of n-type GaAs by epitaxial growth, the n electrode 37a and the p electrode 37b are formed. Thereafter, as shown in FIG. 6B, after it is cut by cleavage into a suitable length, the high reflective multi-layer film 39a is formed at the rear end and the low reflection multi-layer film 39b is formed at the output surface for formation of a resonator, and then, the light shade 4' is formed on the low reflection multi-layer film 39b and on the extension of the center portion of the active layer 33a. As to the shape of the light shade 4', although a circle shape is adaptable, a rectangular shape is preferable since a condition for position accuracy in the vertical direction can be relaxed. A phase adjusting layer (not shown) made of a dielectric film may be inserted between the low reflection multi-layer film 39b and the light shade 4'. In the case of reflection at the metal light shade 4', although the phase is inverted by 180 degrees, it is further corrected by the adjusting layer so that the phase of a laser light returning to the resonator by reflection at the light shade 4' can be made to coordinate with the phase of a laser light in the resonator. Thus, the laser light intensity in the resonator is increased, and it is possible to prevent the deterioration of optical efficiency due to insertion of the light shade 4'.

Like this, by providing the light shade 4' at the output end face of the edge emitting semiconductor laser 30, a laser beam 38a having a light intensity distribution in which light intensity of the center portion is lower than its peripheral portion can be made to be emitted. By condensing the laser beam 38a, the reflected light $2e_2$ at the super-resolution film 23a or 23b and the signal light $2e_1$ from the recording layer 25 can be separated, and reproduction with a high CNR becomes possible. In the case where the reflection type super-resolution film is used, oblique incident light to the surface of the super-resolution film causes plasmon excitation, which will increase the intensity of the near field light.

FIGS. 6C to 6E show a vertical cavity surface emitting semiconductor laser 30a. As shown in FIG. 6C, although the vertical cavity surface emitting semiconductor laser 30a is an oxide embedded ridge type structure laser which restricts an oscillation region 34a by a limiting layer 34b of current and an oscillation region using diffusion of AsOx, other structure can also be used. The vertical cavity surface emitting semiconductor laser 30a includes a GaAs semiconductor substrate 31, an n-type AlGaInP high reflective multi-layer film 39c, an n-type AlGaInP spacer layer 32c, a GaInP active layer 33, a p-type AlGaInP spacer layer 32d, an AlAs layer 34a, an AlOx current limiting layer 34b, a p-type AlGaInP high reflective multi-layer film 39d, an n electrode 37a, and a p electrode 37b. The vertical cavity surface emitting semiconductor laser 30a is manufactured in a manner described below. That is, after the n-type high reflective multi-layer film 39c for a resonator, the n-type spacer layer 32c, the active layer 33, the p-type spacer layer 32d, the AlAs layer 34a, and the p-type high reflective multi-layer film 39d are sequentially deposited on the semiconductor substrate 31 made of n-type GaAs by the epitaxial growth, the AlAs layer 34a is thermally oxidized from the periphery, so that the AlOx current limiting layer 34b is formed. Thereafter, the n electrode 37a and the p electrode 37b are formed.

The shape of the light shade 4' may be a circle as shown in FIG. 6D or may be a rectangle passing the center as shown in FIG. 6E. By making the shape rectangular, an oscillation mode of a peripheral portion of the plane emission laser 30a is fixed, so that stable laser oscillation becomes possible.

Figure 7A:
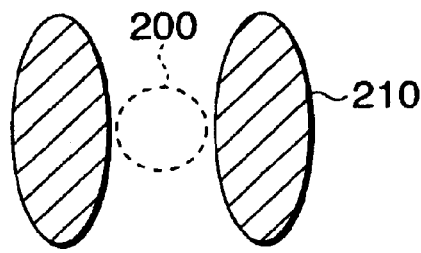
FIGS. 7A to 7D are views showing output modes of a semiconductor laser of a seventh embodiment of the present invention.
Figure 7B:
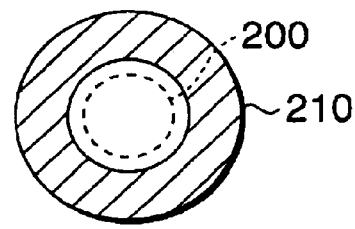
Figure 7C:
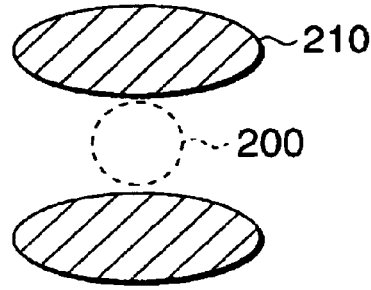
Figure 7D:
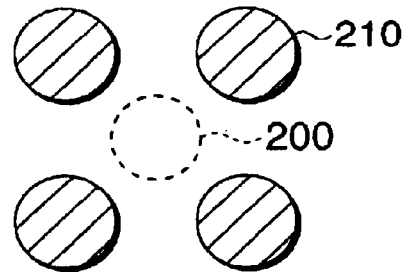

FIGS. 7A to 7D show a semiconductor laser of a seventh embodiment of the present invention. In the seventh embodiment, the first light shade is not used unlike the first to fifth embodiments, but a semiconductor laser emitting a laser light in which at least the intensity of a center portion is lower than a peripheral portion is used. FIG. 7A shows TEM01 mode of x=0 and y=1, FIG. 7B shows TEM01 mode of r=1 and θ=0, FIG. 7C shows TEM10 mode of x=1 and y=0, and FIG. 7D shows TEM11 mode of x=1 and y=1. In all cases, emitted laser light has at least in a center portion 200 low optical intensity and a region 210 of a peripheral portion indicated by oblique lines has optical intensity necessary for recording and reproduction. According to the seventh embodiment, the CNR of a reflected signal light can be increased, and optical efficiency can be increased, so that the intensity of the recording and reproduction light can be increased, and recording and reproduction with high density and high transfer rate becomes possible.

Figure 8A:
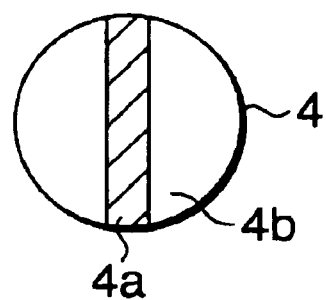
FIGS. 8A and 8B are views showing light shading bodies of an eighth embodiment of the present invention.
Figure 8B:
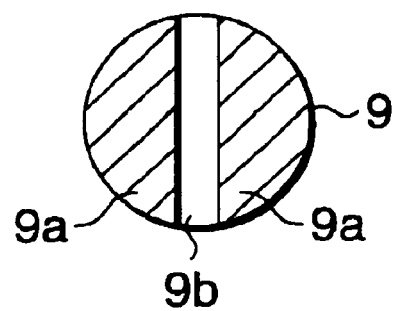
Figure 9A:
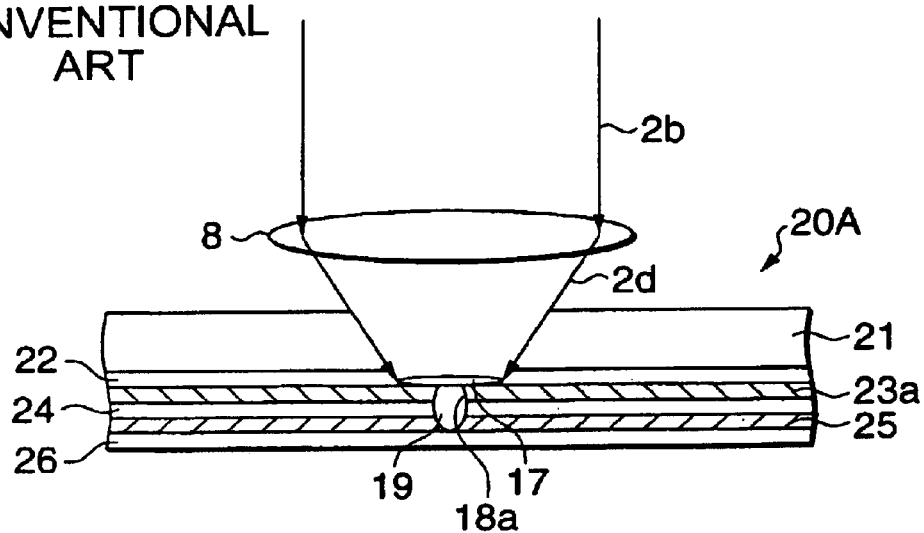
FIGS. 9A and 9B are views showing the main portion of a conventional optical disk apparatus using an aperture type super-resolution film.
Figure 9B:
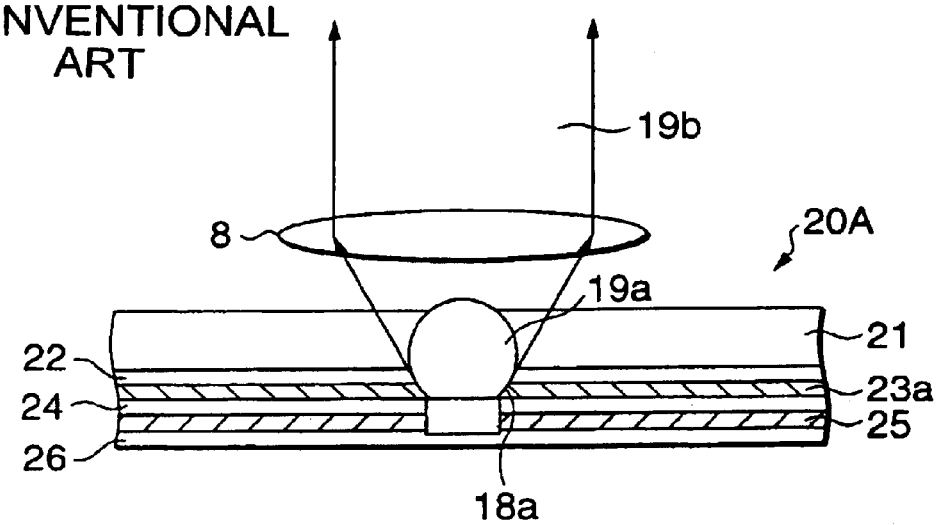
Figure 10A:
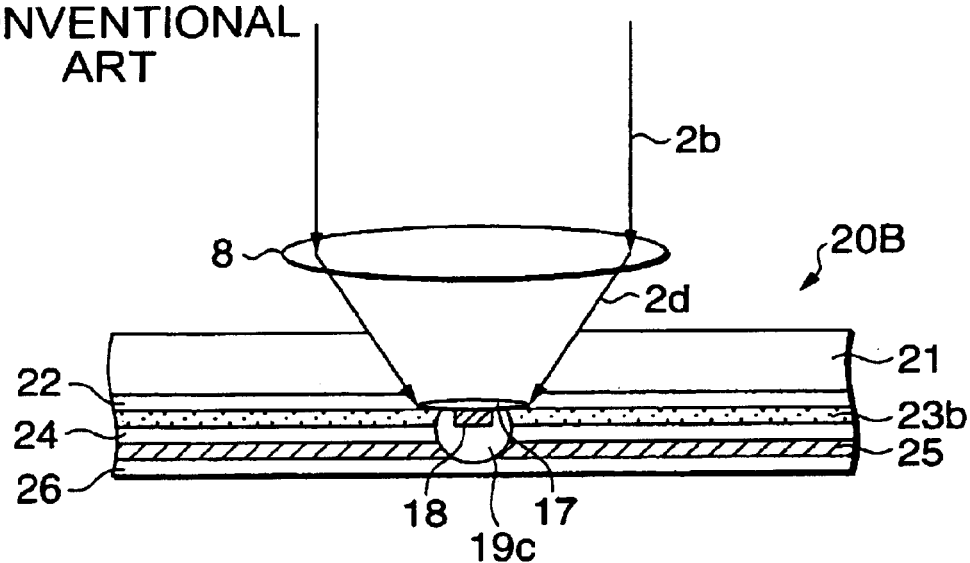
FIGS. 10A and 10B are views showing the main portion of a conventional optical disk apparatus using a scattering type Super-RENS super-resolution film.
Figure 10B:
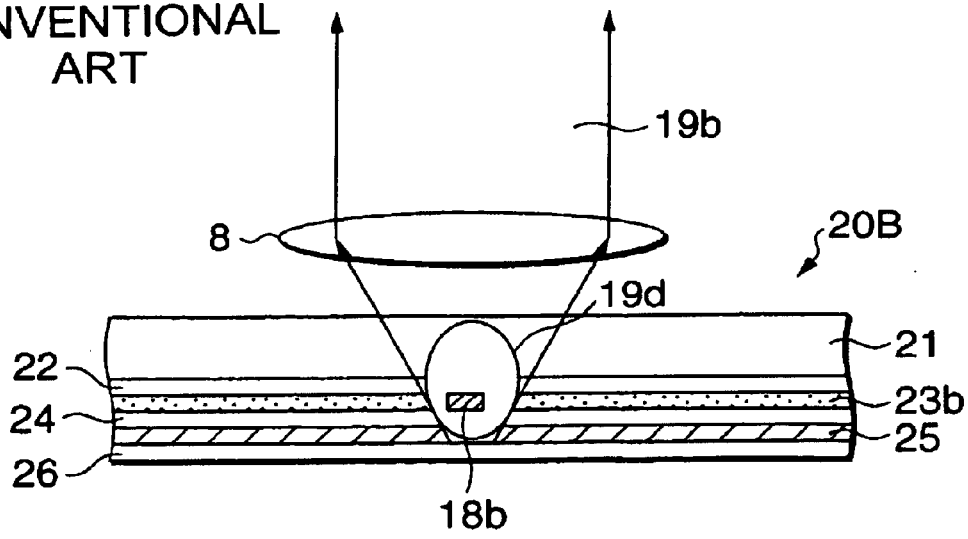
Figure 11:
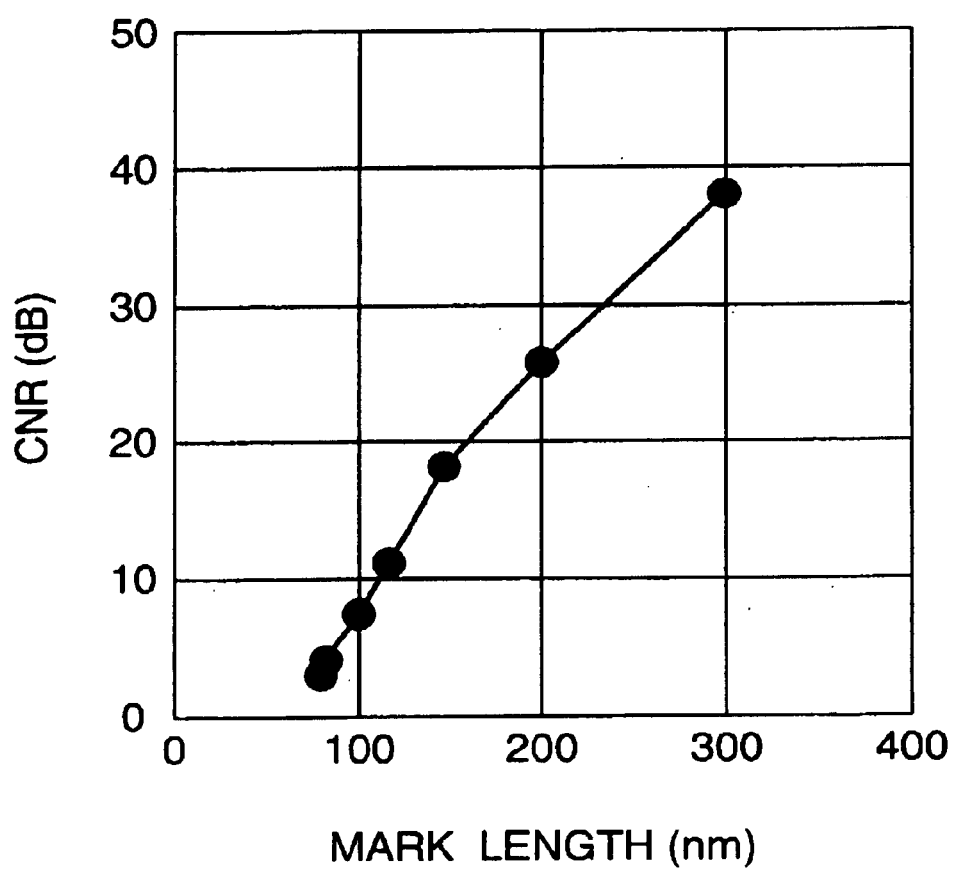
FIG. 11 is a view showing the CNR of the device shown in FIGS. 10A and 10B.

FIGS. 8A and 8B show light shading bodies of an eighth embodiment of the present invention. In the eighth embodiment, the shape of a light shading portion 4a of a first light shade 4 may be made rectangular which is long in one direction as shown in FIG. 8A, and its peripheral portion may be made a transparent portion 4b. In this case, a rectangular transparent portion 9b which is long in one direction is arranged at the center portion and a light shading portion 9a is arranged at its peripheral portion, so that the light shading portion 9a of the second light shade 9 comes to have complementary relation to the light shading portion 4a of the first light shade 4. By making such structure, the condition of positional accuracy in the longitudinal direction of the rectangular shape of the light shading portion 4a or 9a of the light shade 4 or 9 can be relaxed.

Incidentally, the irradiation optical system and the reproduction optical system of the present invention may also be applied to an optical disk not using the super-resolution film.

As described above, according to the optical reproduction apparatus of the present invention, for the purpose of preventing a noise component from being contained in the center portion of the reflected light from the optical recording medium, the super-resolution film is irradiated with the laser light in which the light intensity of the center portion is lower than its peripheral portion, and the center portion of the reflected light from the optical recording medium is used for signal reproduction, so that the CNR can be increased.

In the case where the scattering type Super-RENS is used as the super-resolution film, oblique irradiation of the minute metal body with the near-field light can improve plasmon excitation and the optical intensity enough for high speed reproduction.

According to the optical recording and reproduction apparatus of the present invention, the CNR can be increased, and in the case where the scattering type Super-RENS super-resolution film is used, high speed recording and reproduction becomes possible.

What is claimed is:

1. An optical reproduction apparatus for reproducing information from an optical recording medium in which a super-resolution film is deposited on a recording layer having the information recorded therein, the optical reproduction apparatus comprising:
  an irradiation optical system comprising an annular light shade for condensing a laser light and irradiating the super-resolution film with the light, the laser light having a light intensity distribution the center portion of which is lower than that of its peripheral portion; and
  a reproduction optical system that shades a peripheral portion of a reflected light and reproduces the information from the center portion of the reflected light, wherein a condensing lens is arranged between a light shade and a photodetector.

2. An optical reproduction apparatus according to claim 1, wherein the irradiation optical system includes an optical element provided in a light path of the irradiation optical system and forming the light intensity distribution.

3. An optical reproduction apparatus according to claim 1, wherein
  the irradiation optical system includes:
  a laser light source for emitting the laser light; and
  an optical filter provided in a light path between the laser light source and the optical recording medium, transparency of a center portion of the optical filter being lower than that of its peripheral portion thereof.

4. An optical reproduction apparatus according to claim 1, wherein
  the irradiation optical system includes:
  a laser light source for emitting the laser light; and
  an optical filter provided at an output surface of the laser light source, transparency of a center portion of the optical filter being lower than that of its peripheral portion thereof.

5. An optical reproduction apparatus according to claim 1, wherein the irradiation optical system includes a semiconductor laser for emitting a laser light having the light intensity distribution due to a TEM mode.

6. An optical reproduction apparatus according to claim 1, wherein the reproduction optical system includes an optical filter provided in a light path of the reproduction optical system, transparency of a center portion of the optical filter being higher than that of its peripheral portion thereof.

7. An optical reproduction apparatus according to claim 1, wherein the reproduction optical system includes a reflecting optical element including a reflecting member which has an outer shape smaller than the reflected light, reflects the center portion of the reflected light toward a direction different from an incident direction of the reflected light and allows the peripheral portion of the reflected light to pass through.

8. An optical reproduction apparatus according to claim 1, wherein the irradiation optical system and the reproduction optical system include a common optical element which is provided in a common optical path of the irradiation optical system and the reproduction optical system, form the light intensity distribution of the irradiation laser light, and reflect the center portion of the reflected light toward a direction different from an incident direction.

9. An optical reproduction apparatus according to claim 1, wherein
  the irradiation optical system includes:
  an optical element provided in an optical path of the irradiation optical system and forming the light intensity distribution; and
  a simple reflecting film at a center portion of a section of a common optical path of the irradiation optical system and the reproduction optical system, and a polarization beam splitter at a peripheral portion of the center portion of the section, the polarized beam splitter reflecting or transmitting according to polarization of the reflected light.

10. An optical reproduction apparatus according to claim 1, wherein the reproduction optical system includes an error signal generation unit which generates an automatic focusing error signal or a tracking error signal from the center portion of the reflected light.

11. An optical reproduction apparatus according to claim 1, wherein the reproduction optical system includes an error signal generation unit which generates an automatic focusing error signal or a tracking error signal from the peripheral portion of the reflected light.

12. An optical reproduction apparatus according to claim 1, wherein the super-resolution film is an aperture type, and the reproduction optical system separates a peripheral portion of a reflected light reflected from the aperture type super-resolution film.

13. An optical reproduction apparatus according to claim 1, wherein the super-resolution film is a scattering type, and the reproduction optical system separates a peripheral portion of a reflected light reflected from the recording film.

14. An optical reproduction apparatus for reproducing information from an optical recording medium in which a super-resolution film is deposited on a recording layer having the information recorded therein, the optical reproduction apparatus comprising:

an irradiation optical system for condensing a laser light and irradiating the super-resolution film with the light from oblique direction to the super-resolution film comprising an annular light shade; and a reproduction optical system that shades a peripheral portion of a reflected light and reproduces the information from the center portion of the reflected light, wherein a condensing lens is arranged between a light shade and a photodetector.

15. An optical reproduction apparatus for reproducing information from an optical recording medium, comprising:

an irradiation optical system comprising an annular light shade for condensing a laser light and irradiating the optical recording medium with the light, the laser light having a light intensity distribution the center portion of which is lower than that of its peripheral portion; and a reproduction optical system that shades a peripheral portion of a reflected light and reproduces the information from the center portion of the reflected light, wherein a condensing lens is arranged between a light shade and a photodetector.

16. An optical recording and reproduction apparatus for performing recording and reproduction of information to an optical recording medium in which a super-resolution film is deposited on a recording layer, the optical recording and reproduction apparatus comprising:

an irradiation optical system comprising an annular light shade for condensing a laser light and irradiating the super-resolution film with the light, the laser light having a light intensity distribution the center portion of which is lower than that of its peripheral portion;

a reproduction optical system that shades a peripheral portion of a reflected light and reproduces the information from the center portion of the reflected light, wherein a condensing lens is arranged between a light shade and a photodetector; and a modulation unit for modulating the laser light passing through an optical path of the irradiation optical system in accordance with the information.

* * * * *